(12) United States Patent
Covington

(10) Patent No.: US 9,152,975 B2
(45) Date of Patent: Oct. 6, 2015

(54) WAYFINDING DEVICE

(76) Inventor: Nathaniel Kent Covington, New York City, NY (US)

(*) Notice: Subject to any disclaimer, the term of this patent is extended or adjusted under 35 U.S.C. 154(b) by 341 days.

(21) Appl. No.: 13/554,912

(22) Filed: Jul. 20, 2012

(65) Prior Publication Data

US 2013/0032081 A1 Feb. 7, 2013

Related U.S. Application Data

(60) Provisional application No. 61/513,776, filed on Aug. 1, 2011.

(51) Int. Cl.
| | |
|---|---|
| G09F 7/00 | (2006.01) |
| G06Q 30/02 | (2012.01) |
| G09F 23/00 | (2006.01) |
| E04H 13/00 | (2006.01) |

(52) U.S. Cl.
CPC ............ *G06Q 30/0241* (2013.01); *G09F 23/00* (2013.01); *E04H 13/003* (2013.01)

(58) Field of Classification Search
USPC ........ 40/124.5, 612; 116/209; 52/103; 404/9, 404/34, 42, 71
See application file for complete search history.

(56) References Cited

U.S. PATENT DOCUMENTS

| | | | | | |
|---|---|---|---|---|---|
| 1,051,354 | A | * | 1/1913 | Strachan | 40/612 |
| 3,481,089 | A | * | 12/1969 | Sheidow | 52/103 |
| 5,056,454 | A | * | 10/1991 | Turner | 116/209 |
| 5,809,700 | A | * | 9/1998 | Roush et al. | 52/4 |
| 6,488,441 | B1 | * | 12/2002 | Solime' | 404/42 |

* cited by examiner

*Primary Examiner* — Joanne Silbermann
(74) *Attorney, Agent, or Firm* — William D. Hare; McNeely, Hare & War LLP

(57) ABSTRACT

The invention relates to wayfinding devices including an integral changeable space for advertisements which enable the municipality to provide pedestrian wayfinding and reduce or eliminate the cost of such wayfinding system. The wayfinding device includes a stylized compass and a message element. The stylized compass defines an inner space and is intended to be embedded in a concrete panel and installed in a sidewalk, building façade, kiosk bus stop shelter and/or planter among other possibilities. The advertising element is positioned within the inner space defined by the stylized compass and includes an inner element and a centerpiece removable from the inner element. The centerpiece has a surface having a message portion.

19 Claims, 6 Drawing Sheets

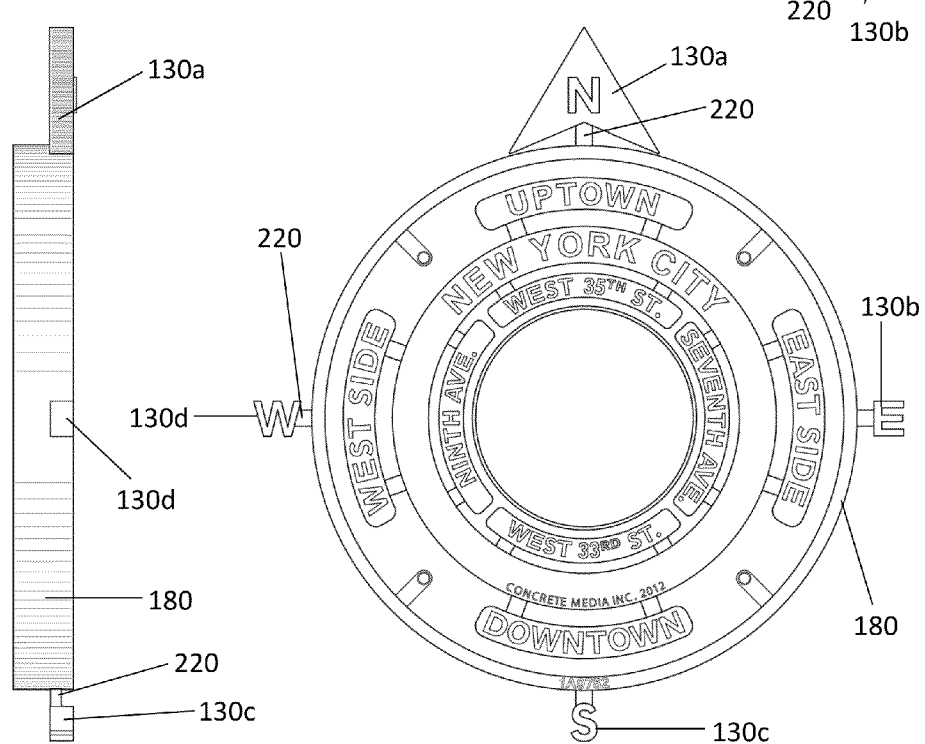

WAYFINDING DEVICE

CROSS-REFERENCE TO RELATED APPLICATIONS

This application claims priority from provisional patent application No. 61/513,776, filed on Aug. 1, 2012, entitled, Metroglyph, the contents of which are incorporated herein in their entirety by reference.

TECHNICAL FIELD

The field of the invention generally relates to wayfinding devices and systems for navigating and orienting pedestrians in an urban environment while simultaneously allowing for an additional changeable message display panel to be displayed such as a paid advertisement, additional wayfinding information for a neighborhood generally or to a (tourist) Point of Interest. The wayfinding devices are used in the Hyper Local-Geo Targeting sub-sector of the Out-of-Home advertising industry.

BACKGROUND

It is a common problem among pedestrians navigating an unfamiliar urban area to become disoriented when exiting a mass transit terminal, bus or light rail stop and/or station; a tourist Point of Interest; or other building. Various solutions have been designed to assist people in finding their way around unfamiliar urban areas, such as a map on a sign mounted on a pole or kiosk indicating where the pedestrian is located by using a large star symbol with other points of interest being drawn into the map. These maps can be helpful but often require the pedestrian to quickly locate the map and remember a number of road names and turns. These signs also are not very helpful in orienting an individual, as so often the individual must first determine which direction they are facing in order to proceed to where they wish to go. Also, these types of signs must be made rather large and can be unsightly, tending to block the urban viewscape, contribute to visual clutter and block the view of junctions, street signs and important landmarks.

Nearby businesses, such as coffee shops, drug stores or restaurants may also be shown on these maps, but tend to get lost in a plethora of other information, their locations relative to the pedestrian's orientation still being just as difficult to determine as with other landmarks marked on the map.

As a result of the inadequacies of the prior art, a pedestrian wayfinding device has been developed by the inventor to orient and provide wayfinding information to pedestrians in a relatively permanent, easily accessible, straightforward and, unobtrusive manner while also providing an interchangeable message display panel providing alternatively, a paid advertisement, additional wayfinding information for a neighborhood generally, and/or wayfinding directions to a (tourist) Point of Interest. An advantage of the wayfinding devices disclosed herein is the ability of a municipality to install a wayfinding system with little or no cost to the city, town or village. Because the wayfinding devices of the invention may provide an integral advertising feature, the municipality may generate revenue from the devices and/or have the devices installed for free by a vendor of such devices.

SUMMARY

In one general aspect there is provided a wayfinding device. The wayfinding device includes a stylized compass and an advertising element. The stylized compass defines an inner space and is intended to be embedded in a concrete panel and installed in a sidewalk, building façade and/or planter. The advertising element is positioned within the inner space defined by the stylized compass and includes an inner element and a centerpiece removable from the inner element. The centerpiece has a surface having a message portion.

Embodiments of the wayfinding device may include one or more of the following features. The stylized compass may include an outer element forming an outer border of the wayfinding device and from which extends one or more directional indicators, the outer element and the directional indicators having upper surfaces.

The inner element may be formed by a wall forming an inner surface that defines a cavity with the wall having an upper end defining an upper surface which presents visibly when installed. The centerpiece is positioned relative to the outer element such that the centerpiece is within a space defined by the outer element.

The wayfinding device may further include one or more directional indicators extending from the inner element into the space defined by the outer element.

The wayfinding device may further include a middle element positioned within the space defined by the outer element, wherein the middle element has an inner diameter that is greater than an outer diameter of the inner element such that the middle element surrounds the inner element and centerpiece. The wayfinding device may further include one or more directional indicators extending from the middle element. One or more of the outer element, middle element and inner element may be in the form of a band having alphanumeric characters on, in or extending from its upper surface.

The upper surfaces of the outer element, the inner element, directional indicators and centerpiece may be generally in the same horizontal plane.

The wayfinding device may further include one or more structural elements or plates extending between and connecting the outer element and the inner element.

The directional indicators may be made of a base and one or more alphanumeric elements extending from the base with upper surface(s) of the alphanumeric elements being generally in the same horizontal plane.

The directional indicators may further include an attachment tab extending from the base and attaching the base to the outer element. The outer element and inner element may be made of a metal alloy. The metal alloy may be bronze.

The inner surface of the inner element may be threaded and the centerpiece may be threaded such that the threads of the centerpiece are threadably mated with the threaded surface of the inner element such that the centerpiece is positioned and fixed within the cavity of the inner element.

The upper surface of the centerpiece may be a glass upper surface. The upper surface of the centerpiece may display one or more of an advertisement, a Quick Response (QR) code, and a symbol. Scanning the QR code may provide a link to a webpage containing information relevant to the location of the advertising entity, a tourist point of Interest or the wayfinding device itself.

The wayfinding device may be embedded in concrete. The wayfinding device in concrete may be in a sidewalk panel.

In the wayfinding device, the messaging may be an advertisement.

In another general aspect a wayfinding device may include an outer ring, an inner ring, and a centerpiece. The outer ring has a generally circular shape, defines a first generally circular space within the outer ring and from which extends one or more directional indicators, the outer ring and the directional indicators having upper surfaces which present visually when installed. The Inner Ring has a generally circular shape, defines a second generally circular space within the Inner Ring and from which extends one or more directional indicators, the Inner Ring and the directional indicators having upper surfaces which present visually when installed, and the Inner Ring being positioned in the first generally circular space defined by the Outer Ring. The inner ring has a generally circular shape, a cylindrical wall defining an inner surface that defines a cavity within the inner ring and from which extends one or more directional indicators, wherein the cylindrical wall has an upper end defining an upper surface which presents visually when installed and the directional indicators have an upper surface which presents visually when installed. The centerpiece is removably positioned within the cavity of the inner ring, wherein the centerpiece has an upper surface which presents visually when installed and the upper surface comprises one or more of an advertisement, a QR code, and a symbol. The wayfinding device includes one or more structural elements connecting the outer ring, inner ring and centerpiece. The upper surfaces of the outer ring, inner ring, directional indicators and centerpiece are generally in the same horizontal plane.

Embodiments of the wayfinding device may include one or more of the features described above or discussed below.

In another general aspect there is provided a method of wayfinding. The method includes providing a wayfinding device in which the wayfinding device provides direction indicators to one or more points of interest, direction or street. The wayfinding device includes a stylized compass and an advertising element. The stylized compass defines an inner space and is intended to be embedded in a concrete panel and installed in a sidewalk, kiosk, building façade and/or planter. The advertising element is positioned within the inner space defined by the stylized compass and includes an inner element and a centerpiece removable from the inner element. The centerpiece includes a surface having a message portion.

The direction indicators are used to determine a direction of travel to one or more of a point of interest, commercial establishment or street and/or the QR code is used to access a webpage providing information related to the specific location of the wayfinding device.

Embodiments of the method may include one or more of the features described above or discussed below.

One or more advantages may be provided by the wayfinding devices described herein. For example, the wayfinding devices may improve the ease by which pedestrians can navigate through an unfamiliar environment because they easily provide directional indicators and contextual location indicators.

The wayfinding device of the present invention is primarily designed to orient mass transit riders (e.g., subway, train and buses among others) at the precise point where they convert to pedestrian travel to complete their journey on foot. Secondarily the Centerpiece messaging is designed to alternatively, notify them of proximate commercial establishments that may meet an immediate need, provide additional specific pedestrian wayfinding information for the surrounding neighborhoods, and/or provide specific wayfinding information to particular Points of Interest especially tourist Points of Interest (e.g. the 9/11 Memorial, The Empire State Building, The Metropolitan Museum or the New York Stock Exchange).

The wayfinding devices may be profit-making for the entity installing them and therefore provided at a reduced or eliminated (zero) cost to the town or city in which they are installed. For example, by including advertisements on the changeable Centerpiece, the entity may generate funds that not only cover the installation of the wayfinding device but continue to generate revenue. The wayfinding device may augment currently existing wayfinding devices such as street signs and kiosks with street maps by providing contextual and directional information not readily gained from existing wayfinding devices.

The wayfinding device may be readily updated by replacing the Centerpiece or information within the Centerpiece to contain a new or modified message whether that message be for an advertisement for a proximate retailer, a tourist Point of Interest or additional wayfinding information. This notification ability covers both commercial and tourists uses.

The wayfinding device may be easily seen yet is unobtrusive in that it does not obstruct the viewscape of streets or prevent use of the sidewalk. The wayfinding devices possess physical integrity that withstands pedestrian foot traffic and other known physical impacts occurring in an urban environment including, wind, salt, vandalism, snow, etc. The wayfinding device uses well-known symbols and abbreviations that improve its ability to be quickly comprehended or understood by most pedestrians transiting a location in which the device is placed, whether or not they are native language speakers. The wayfinding device is designed so that passing pedestrians may quickly assimilate the information it presents. The wayfinding devices may use technology, such as Quick Response (QR) codes that allows the user of a Smartphone to scan the QR code and be taken to a website associated with the Metroglyph to receive additional information regarding an advertisement for a proximate retailer, a tourist Point of Interest, or additional wayfinding information.

DESCRIPTION OF THE DRAWINGS

FIGS. 5 and 6 are bottom and top views, respectively, of the wayfinding device prior to being installed into pavement with the Centerpiece attached to the device.

FIGS. 7 and 8 are two side views of the wayfinding device of FIGS. 5 and 6.

DETAILED DESCRIPTION

Figure 1:
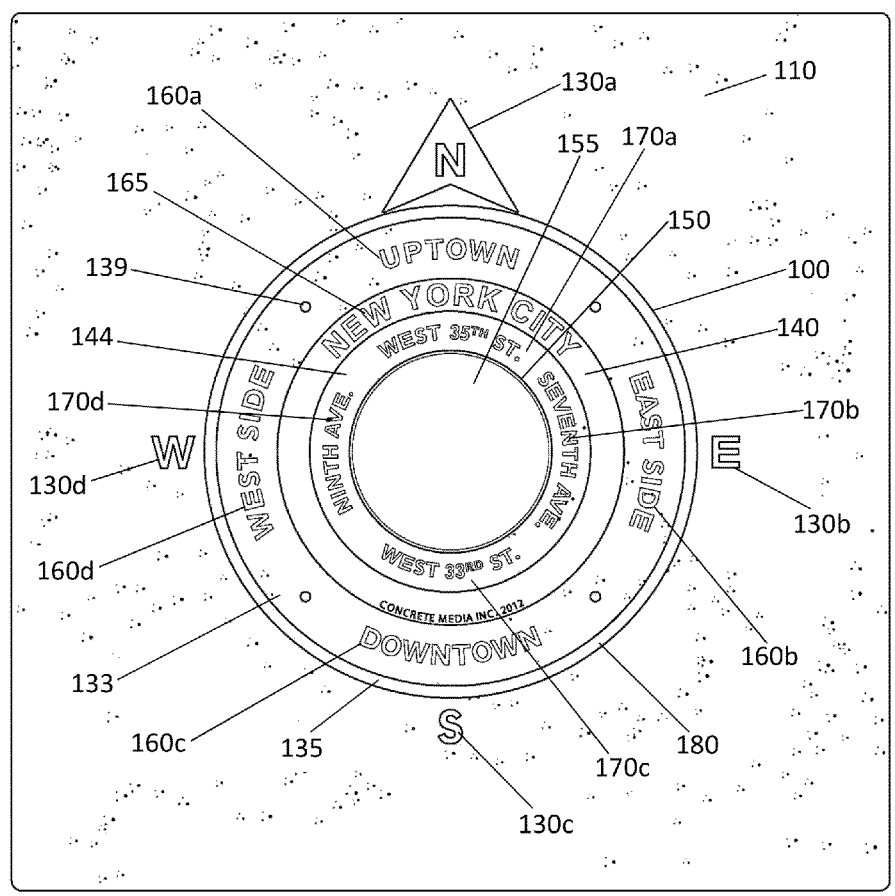
FIG. 1 is a perspective view of the wayfinding device which is shown as being installed into pavement, such as a concrete sidewalk.

The inventor has developed a system and method to address the inadequacies of prior art methods of providing directions, information and advertising to pedestrians in urban areas or other areas frequented by tourists in an unobtrusive manner keeping in mind the desire for a de-cluttered pedestrian streetscape. As noted above, the wayfinding device of the invention is primarily designed to orient mass transit riders (e.g., subway, train and buses among others) at the point where they convert from mass transit travel to pedestrian travel to complete their journey on foot. Secondarily the Centerpiece is designed to provide pedestrian wayfinding information for neighborhoods generally, notify them of proximate commercial establishments that may meet an immediate need and/or provide specific wayfinding information to particular Points of Interest, especially tourist Points of Interest.

At a most basic level, the wayfinding device is made up of a stylized compass and a message or advertising element. The stylized compass defines an inner space and is intended to be embedded in a concrete panel and installed in a sidewalk, building façade, kiosk, bench, bus stop shelter and/or planter. The advertising element is positioned within the inner space defined by the stylized compass and includes a housing and a centerpiece removable from the housing. The centerpiece has a surface having a message portion.

TERMINOLOGY

The following terms are used herein and have the associated meaning:

Ring: the rings of the Metroglyph or wayfinding device which define the perimeter areas of the Metroglyph and to which are attached different directional text elements; the Metroglyph may include an Outer Ring, a Middle Ring and/or an Inner Ring. The Rings also may be referred to generally as an outermost element, a middle element or an innermost element.

Band: a ring that is wide enough to permit text elements on, in or extending from the surface. A band may be referred to generally as an outermost element, a middle element or an innermost element.

Base: a flat surface on which is mounted or from which extends text elements.

Text elements: letters, number or the like which may extend off of Bases and give, for example, a street name or direction. The term includes all alphanumeric symbols. It should be noted that the unique ID number disclosed herein is a text element but is not on a separate base.

Attachment Tabs: extend off of Bases and attach Bases to a Ring.

Structural Elements: plates, rods, bars, frame, etc. that extend between and connect one or more of the outer element, the middle element, the inner element, rings, housing, etc., where those components are present. The structural elements have the function of positioning each ring or component of the wayfinding device in the correct position relative to the other ring such that the top surface of all elements of the device are precisely flush.

Centerpiece: the entire removable element carrying the changeable message from the Metroglyph sponsor.

Housing: the center portion of the Metroglyph in which the Centerpiece sets. The Housing may be threaded, may have a role in housing a power source such as a battery or magnets that secure the Centerpiece. In some implementations the Housing may be generally referred to as the innermost element and used to indicate any shaped element that receives the Centerpiece in a variety of ways, e.g., threadably, with screws, fasteners, etc.

Button: the very center of the Centerpiece having a diameter of approximately 2" or less and typically containing a symbol representing the Sponsor's business or a Quick Response Code (QR code).

Directional indicators: a text element that provides a direction (e.g., North or N), a region (e.g., Uptown), a street (e.g., $9^{th}$ Avenue), a neighborhood (e.g. Greenwich Village) etc.

Contextual Information: Information that is relevant only because of the proximity of the Metroglyph or wayfinding device to various aspects of the surrounding area, such as streets, neighborhoods, transportation hubs or stations.

Local knowledge: refers to wayfinding knowledge or devices that locals (or those with some local knowledge) can use to orient themselves, such as the fact that The Avenue of The Americas (aka $6^{th}$ Avenue) runs one-way uptown and intersects Broadway at 34th Street, for example. The Metroglyph will contain local knowledge references where possible.

Because the wayfinding device disclosed herein is fixed in concrete in position in a sidewalk, the device is inherently designed to be tamper proof, durable and relatively permanent. Similarly it is not prone to misalignment from the wind, damage from vehicle impacts or disfigurement by vandalism. Furthermore, unlike conventional signage, it is not limited to placement at street junctions or on poles and therefore can be placed in a variety of locations within a city or other urban area. For example, although the figures provided below are directed to a wayfinding device positioned horizontally within a sidewalk, the device can easily be placed in a vertical wall panel of a building, a vertical wall panel of a large planter at a street intersection, etc. It is expected that the wayfinding device described herein will primarily be placed in the horizontal plane of the earth, such as in a sidewalk.

The wayfinding device is expected to operate or be most useful in two established industries: (a) the urban wayfinding industry where signage, maps and now electronic information is conveyed to pedestrians to aid their locomotion and (b) the Out-of-Home advertising segment of the advertising industry and more specifically the Hyper Local—Geo Targeting subsector of the Out-of-Home advertising industry. This subsector of the advertising industry reaches consumers at or near the point of purchase and seeks to directly influence their immediate purchase decision as opposed to primarily creating or building brand awareness. Thus the advertising message provides additional relevant wayfinding information sought by certain pedestrians seeking to make an immediate purchase. An explanation of how the configuration of the wayfinding device provides benefits in both of these industries is provided below.

Figure 2:
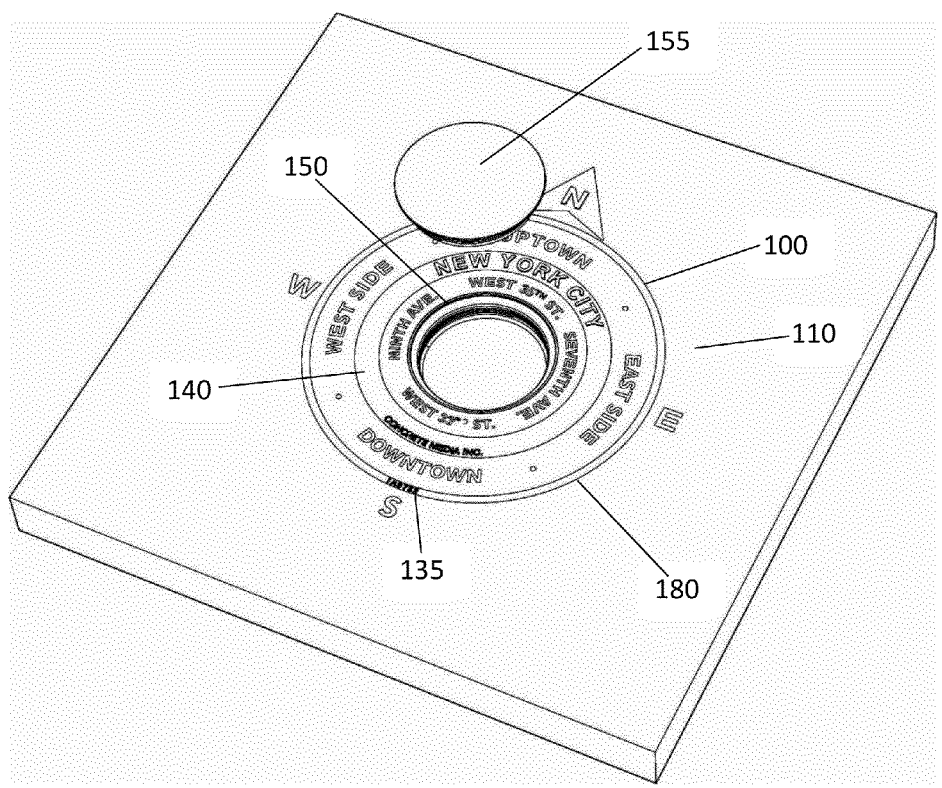
FIG. 2 is a perspective view of the wayfinding device shown as being installed into pavement and further showing a Centerpiece removed from the device.

As shown in FIGS. 1 and 2, the pedestrian wayfinding device 100 may be in the form of a large round compass comprised of two or more (e.g., 2 or 3 pieces) assembled parts made of metal alloys, ceramics, glass, plastics, and/or enamel components which are embedded or installed into a concrete surface such as a pavement panel or section 110 of identical dimensions. A pavement panel or section is used herein to describe one delineated rectangle of sidewalk concrete. This pavement section may be incorporated into any pre-existing sidewalk or walking path by replacing one pre-existing pavement section with a pavement section of identical dimensions in which the wayfinding device has been previously embedded. One supplier of a wayfinding device according to the invention is Concrete Media, Inc. of 105 East 63rd Street, New York, N.Y. 10065, (www.concretemediainc.com) which has developed the Metroglyph™ wayfinding device. The terms wayfinding device and Metroglyph are used herein interchangeably.

The Metroglyph wayfinding device has the following elements. First, the Metroglyph wayfinding device has an outer region in which are positioned English language abbreviations of major compass points (i.e., E (East), S (South), W (West), N (North)) 130*a-d* with the north compass point further defined by a large triangular arrow head 130*a* or other stylized arrow pointing in a northerly direction. This permits pedestrians that do not speak the native language to easily recognize North.

Second, the device 100 includes an Outside Element 180 that contains a unique identifying alphanumeric number 135 that may be used in a Smartphone application for providing additional information to the user. Of course, it should be understood that the unique identifying number may be merely a unique identifier of that particular wayfinding device. Although FIGS. 1 and 2 illustrate an outside element in the form of a circular ring, it also should be understood that the outside element can take a variety of shapes, such as for example, an oval, a rectangle, a square or a diamond shaped frame or border. One advantage of a diamond shaped border is that each of the major compass points can be located at an angle of the Outside Element 180 and thereby provide a visual indication of the direction associated with that point. The function of the Outside Element 180 is to provide a separation between the outer region and a space 133 within the outside element. The outside element 180 also can be in the form of a band, which is an element that has sufficient width to include text elements on, in, or extending from the surface of the element. Thus a diamond shaped band would have four sides joined to form four angles and the upper surface of the band would be wide enough to permit text to be on, in or extending from the surface of the element.

Third, the device includes the space 133 within the outside element 180 to provide contextual wayfinding references 137 (e.g., Uptown, Downtown, East Side, West Side for New York City) and decorative elements 139 such as dots to provide an aesthetic effect between the wayfinding references.

Fourth, the device includes a Middle Element 140 that denotes the name of the relevant city and separates the space 133 within the outside element 180 and the space 144 defined within the Middle Element 140. FIGS. 1 and 2 illustrate the Middle Element as being in the form of a circular band. However, like Outside Element 180, it should be understood that the Middle Element can be in the form of the form of a circular ring, a rectangle, a square or a diamond shaped frame or border. A function of the Middle Element 140 is to provide a separation between the space 133 and the space 144. Thus, it should be understood that any shape or width can be used to accomplish this function.

Fifth, the wayfinding device includes the space 144 between the Middle Element and the Innermost Element 150 that contains contextual wayfinding information relevant to the location of the wayfinding device (i.e., Metroglyph) such as the next adjacent streets or avenues one block away from the intersection at which the Metroglyph is located. The design of the Metroglyph presumes that a street sign on a post will denote the names of the intersecting streets immediately proximate to the Metroglyph location. In this way the device works together with and augments previously existing wayfinding devices. In FIGS. 1 and 2, the Innermost Element 150 is in the shape of a circular ring or collar. It should be understood that the Innermost Element can be in the form of a circular band, a rectangle, a square or a diamond shaped frame or border. A function of the Inner Element 140 is to provide a separation between the space 144 and an inner region of the Innermost Element. Thus, it should be understood that any shape or width can be used to accomplish this function.

As explained below, an additional function of the Innermost Element is to receive a Centerpiece 155. The Centerpiece is received into the Innermost Element by any of a variety of means, including threadably received (left handed or right handed threads), interference fit, fastened with fasteners, screwed into place, etc.

Sixth, the device includes the removable and replaceable Centerpiece 155 inserted and attached into the Innermost Element 150, which may be in the form of a base cylinder, and which carries advertising messages pertaining to an advertiser or additional wayfinding information pertaining to a proximate Point Of Interest. The Centerpiece 155 may display Quick Response (QR) codes which when scanned via a Smartphone by the Pedestrian will provide them additional information regarding an advertiser or additional wayfinding information. The Centerpiece also may contain universal retail symbols denoting the nature of the advertisers' nearby commercial enterprise. As should be understood, these symbols include that of a steaming coffee cup for a nearby coffee shop, a fork and knife for a nearby restaurant, a bed for a nearby hotel, an Rx for a Pharmacy, an ATM symbol for a bank, the WiFi symbol for an establishment offering WiFi connectivity, each among other various symbols that may pertain and communicate quickly the type of goods or services available through the advertising entity. As should be understood from the above description, the Metroglyph device can be described as consisting of a permanently embedded portion and a removable portion, i.e., two pieces.

Seventh, The Centerpiece 155 may contain a Button that is positioned in the center of the Centerpiece and has a diameter of approximately 3" or less. The Button typically contains a symbol representing the Sponsor's business or a QR code. The Button may be integral with the Centerpiece or may be separately inserted and removed. The interchangeability of the Button permits the symbol and/or QR to be readily replaced exchanged.

In a more general implementation, the wayfinding device may be of any size and shape which is suitable for its location and purpose. The inventor believes that the size of the wayfinding device should be such that the text can be read from up to twenty to twenty-five feet away by pedestrians exiting a nearby subway station, for example. However, the device should not be construed as being limited to a particular size and will be sized according to its intended location, for example proximity to locations where most pedestrians will readily notice and use it. FIG. 1 shows the wayfinding device 100 embedded in a concrete pavement 110 and having a circular shape with the appearance of concentric circles therein to denote different informational elements. FIG. 1 is specific to the urban area of New York City; however this city is used only as an example. Further, FIGS. 1-8 illustrate one implementation of a wayfinding device that uses concentric rings and/or bands as the outermost, middle and innermost elements. It should be understood from the above discussion that other shapes may be used in place of the rings and bands and still be within the scope of the invention.

Attached to and located on the outside of the Outermost Element or ring 180 are directional elements 130a-d, denoting the directions of North, East, South, and West, respectively, such that in one aspect the wayfinding device 100 resembles an analog compass residing in the plane of the earth that it describes, eliminating the interpretation that a vertical map (e.g. on a street sign) requires. Additional directional elements, not shown in FIG. 1, may be present indicating the Northeast direction, the Southeast direction, the Northwest direction and the Southwest direction. Informational elements 160 may be included and used to identify commonly used terms (i.e., local knowledge) pertaining to the region in which the Metroglyph resides of a particular city. For example, in FIG. 1, elements 160 are used to identify well-known regions in New York City which helps pedestrians with their orientation within the city. Here, the elements used are Uptown, East Side, Downtown and West Side, respectively. Other wayfinding labels or terms that could be used are the names of proximate neighborhoods, rivers, boroughs, parks and/or major transportation stations, terminals or facilities.

In the middle ring or Middle Element 140, the name of the urban area or city name 165 may be identified. In FIG. 1, which is specific to New York City, the name of New York City is depicted (alternatively the borough name, e.g. Manhattan may be depicted). Attached to or integral with the Middle Element 140 are orienting informational elements 170*a-d* which identify the streets which can be found in the next intersection in the direction of the marked directional element 160*a-d*. For example, in FIG. 1, directional elements 160*a* and 160*b* identify the Uptown and Downtown directions and orienting informational element 170*a* identifies West $33^{rd}$ Street. In this example, if a person viewing the wayfinding device 100 were to walk in the southern direction 160*c* in the direction of Downtown, the person would encounter West $33^{rd}$ Street at the next intersection. This is particularly useful when a pedestrian exits a subway or train station in a new environment and does not know the direction they need to start walking. Where the streets are consecutively numbered, as in NYC, the information provided by a traditional street sign does not indicate in which direction the numbered streets are higher or lower numbers, which information, were it available, would allow the pedestrian to determine the proper direction in which to proceed. With the orienting informational elements 170*a-d*, the pedestrian will quickly know the direction in which they must proceed.

Figure 3:
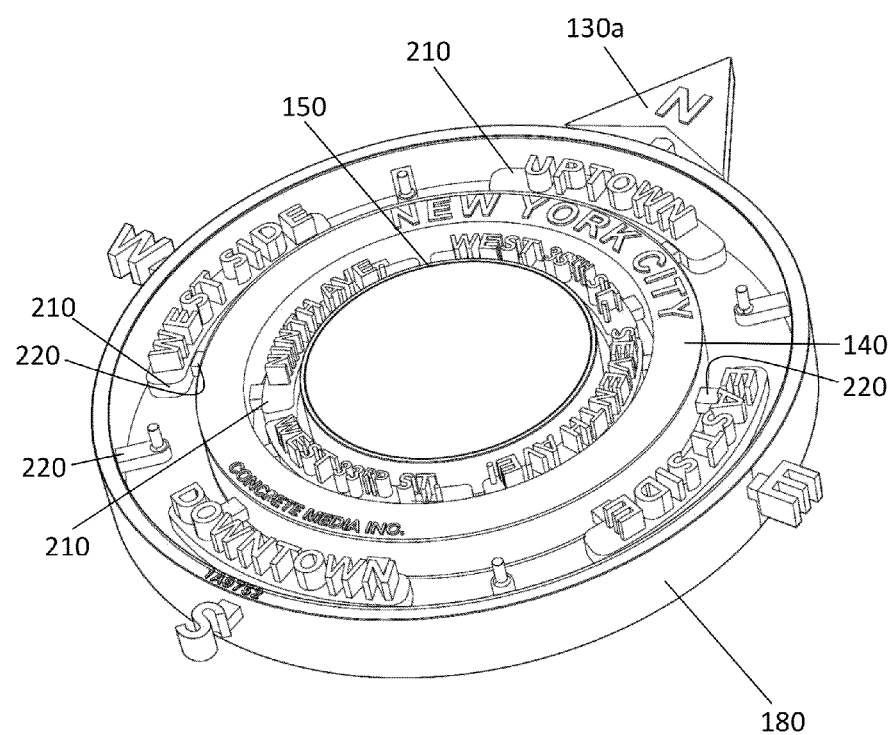
FIG. 3 is a perspective view of the wayfinding device prior to being installed into pavement with the Centerpiece attached to the device.
Figure 4:
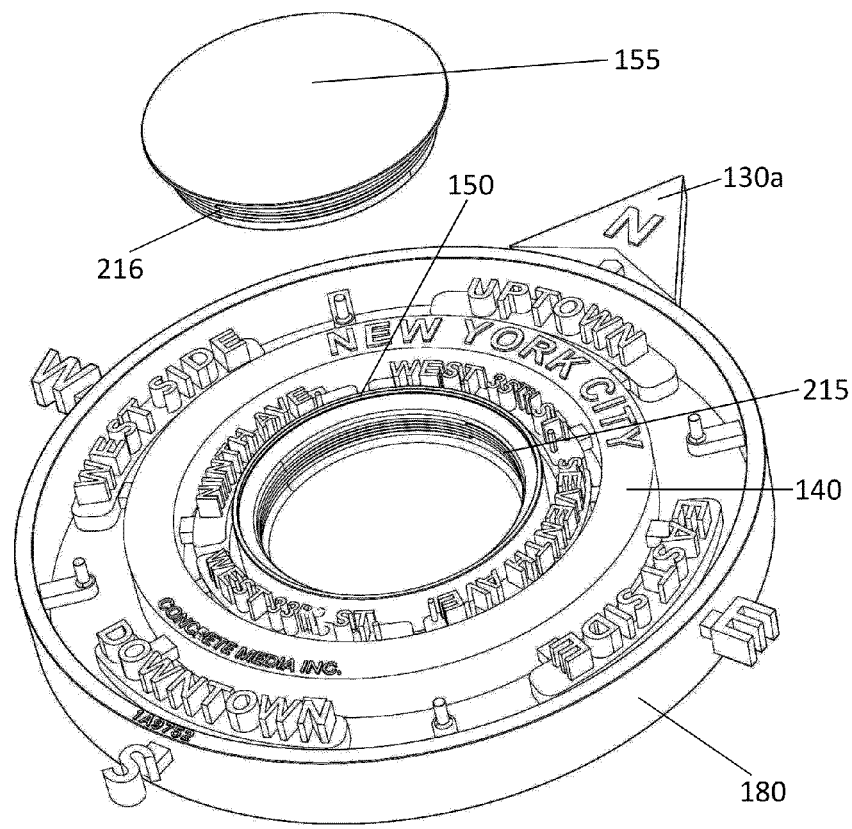
FIG. 4 is a perspective view of the wayfinding device prior to being installed into pavement with the Centerpiece removed from the device.

FIGS. 3 and 4 depict the wayfinding device 100 before it has been installed into pavement or concrete. In general, the wayfinding device has a depth which is less than the pavement depth and is located within the pavement such that the surface of the device is precisely flush with the surface of the surrounding paving material. In this way, the wayfinding device will reside in the same horizontal plane as the sidewalk surface such that it appears continuous with the surrounding concrete. This depth and alignment is preferable in order to prevent pedestrians from tripping on the device and to comply with Federal statutes contained in the Americans with Disabilities Act (ADA). In one implementation, the device may be assembled from several components which are manufactured out of cast bronze among other metal alloys. One or more components may be assembled using screws, welds or other fastening techniques or means, for example.

The wayfinding device in general can be manufactured and/or assembled in a variety of ways that are well known in the art. Such methods include lost wax casting, sand casting, die casting or other techniques. The text elements (alphanumeric characters) may be cast singularly, as complete words or clusters of words. Alternatively, they may be cut from a billet or block of the selected alloy by water jet cutting method and attached to the appropriate ring or element. Application of these and other techniques are described below.

Fabrication of the wayfinding device, e.g., The Metroglyph, may be done in a multitude of ways. Because certain elements (sub-components) of each Metroglyph are appropriate for a specific physical location, each one will likely possess a unique design. Therefore, virtually every Metroglyph will contain unique elements, particularly the text elements that may be contextual to its location. Few, if any, Metroglyphs will be identical, they will likely possess many common design elements, therefore, several factors must be considered when deciding the optimal fabrication method or process. These factors include:

1. Extent to which The Metroglyphs are of an identical or nearly identical size,
2. Degree of commonality of non-textual design elements between The Metroglyphs to be produced,
3. Degree of commonality of textual design elements between The Metroglyphs to be produced,
4. Number of Metroglyphs to be produced having some or substantially all identical elements, (e.g. having the identical City, street, or neighborhood names as their text elements.)
5. Possibility of future orders for identical or very similar Metroglyphs in the future.

Elements of The Metroglyph may be cast from molten metal alloys and/or machined from metal alloy stock. Many possible non-ferrous alloys/metals may be used including:

1. Bronze alloys
2. Aluminum alloys
3. Brass alloys
4. Stainless steel
5. Hi-tech variations of the preceding alloys that may contain titanium, manganese, tungsten or other alloying materials that confer desired properties to The Metroglyph.

There are many casting techniques that are appropriate including:

1. Sand casting,
2. Lost wax (or investment) casting, and
3. Die casting among others.

Within these primary casting techniques further variation is possible depending upon the relevant factors. For example casting techniques may include variations of process within these broad categories including: hot box, shell casting, lost foam, permanent mold, green sand and V-Process among others. The text elements may also be fabricated on a base (the Base) so that all alphanumeric characters letters are interconnected by design and cannot move relative to each other. These may be alternatively cast or cut from alloy stock using a Computer Aided water jet cutting machine.

The Metroglyph body (concentric rings and center Cylinder including all connecting structural elements) component may be cast (without the textual elements) as one entire casting. Textual elements pertaining to the anticipated site of The Metroglyph may be cast as sub-elements each on a Base and subsequently attached to The Metroglyph body by means of welding, sheet metal or machine screws, "dovetail" type joinery by means of a tab (the "tenon") extending from the Base and a slot or channel (the "mortise") on the underside of the Metroglyph ring or a combination of the preceding methods.

The Centerpiece of the Metroglyph may be fabricated out of the same alloy as the Metroglyph body. It may attach to the body by means of a thread cut into the Cylinder of The Metroglyph and corresponding threads cut into the Centerpiece exterior wall. Affixment and removal may be through the use of a specially designed tool or wrench that fits into two or more depressions in the top of the Centerpiece. In this way the Centerpiece may be removed to alter or update its message but only by the owner/agent of The Metroglyph.

The message on the top surface of the Metroglyph may be silk screened over metal or created by means of enamel on a ceramic insert that is then affixed from the underside of the Centerpiece top by means of nut and bolt fasteners. The entire top surface of the Centerpiece may be protected from foot traffic and other sidewalk hazards by a glass impervious to scratching that is now on the market.

The Outer Ring 180 may be manufactured from one mold, for example, together with the directional text elements 160*a-d* denoting the directions of north, east, south, and west, all being made of a single mold. These elements will pertain to every wayfinding device because there is nothing contextual to these elements. The Outer Ring and directional text element also can be cast separately if desired and the directional text elements then fastened to the Outer Ring in the locations shown in FIGS. 1-4 using one or more attachment tabs 220. For example, the attachment tabs 220 may be formed integrally with the directional text element and its Base and include a threaded channel along its length. The end of the attachment tab 220 may have a slight curvature to match and mate with the circumference of the Outer Ring 180. The Outer Ring 180 may be processed to have one or more channels from the outer surface to the inner surface such that the attachment tabs can be mounted to the Outer Ring 180 at the appropriate location around its circumference. If the attachment tab 180 has a slight curvature, the end of the attachment tab will be flush with the Outer Ring 180 when mounted to the Outer Ring.

Figure 5:
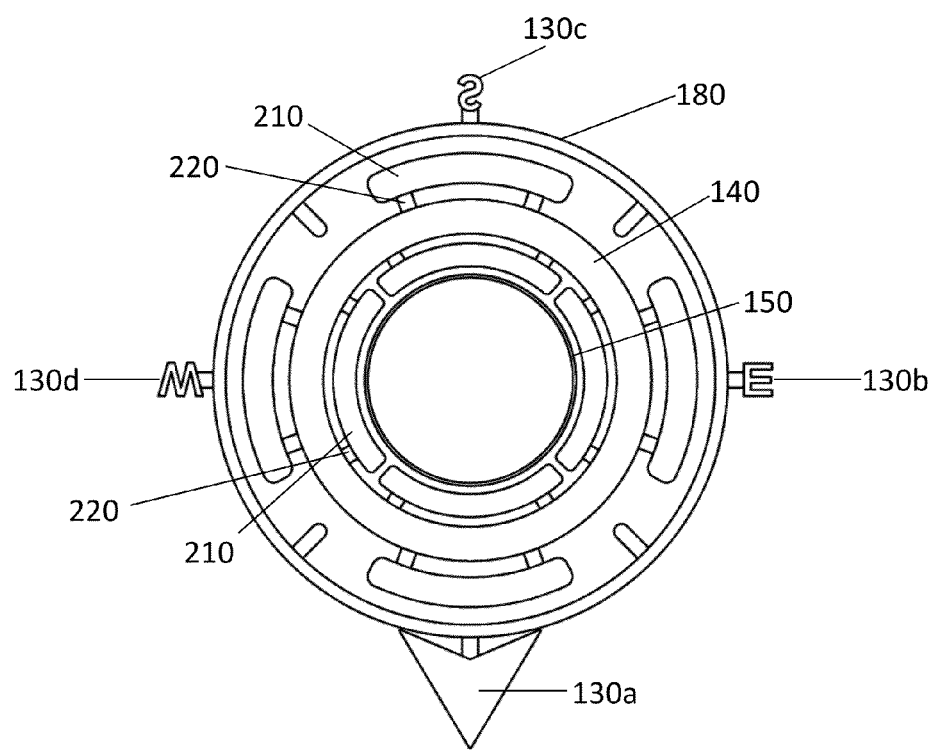

The text elements shown in FIGS. 1-4, such as text elements 160a-d and 170a-d may lie on one or more Bases 210, with each Base being attached to or forming one solid piece through attachment tabs 220 and one or more rings 140, 150 or 180. Each attachment tab 220 can be better viewed in FIG. 5, which provides a bottom view of the wayfinding device 100. FIG. 5 also illustrates the bottom surface of each Base 210 which contains the text elements and/or any other content which is desired to be displayed on wayfinding device 100.

The methods of casting text elements on a Base with an attachment tab are well known in the art of metallurgy and therefore these methods are not discussed further.

The Middle Ring 140 may be similarly made of one solid piece with any text or other content being integral to its design (raised or sunken lettering, for example) or separately fabricated and fastened thereon using Bases 210 and attachment tabs 220 in the locations shown in FIGS. 3-5 using the methods described above. The Middle Ring 140 and text elements 160a-d and 170a-d may be made of one solid piece having the desired text or figures included in the mold itself. For example, shown in FIGS. 3 and 4 are informational text elements 170a-d which are manufactured such that they form a solid piece with Middle Ring 140, or may be fastened thereon using any method known to one of ordinary skill in the art. The orienting text elements 160a-d which identify street names may also be manufactured such that they form a solid piece with Middle Ring 140, or are fastened thereon using any method known to one of ordinary skill in the art.

The Inner Ring or Cylinder 150 is shown to have threading 215 on its inside surface such that the threading 216 of Centerpiece 155 may be interchangeably mated therewith to allow for easy installation and removal of the Centerpiece from the Cylinder. The threading can be either left- or right-handed.

The three rings 140, 150 or 180 may be manufactured separately from each other and subsequently joined together with structural elements. The rings may be mounted together using plates, bars, rods, a frame, etc. or other member or structural element that positions each ring in the correct position relative to the other ring such that the top surface of all elements of the device are precisely flush. The three rings may be fastened together using screws (not shown) in order to achieve the desired spacing between each ring before embedding the Metroglyph in the concrete.

All elements, once assembled will thereafter be placed on a flat surface in a mold before pouring concrete therein. The wayfinding device is manufactured such that the upper surface of each element, including the rings and text, are at the same height such that when concrete is poured into the device to form a pavement stone, each element is thus equally visible to the pedestrian and precisely flush with the surrounding concrete sidewalk.

The figures depict a Centerpiece 155 which in one embodiment may be used as advertising media for, typically, nearby companies to promote their retail businesses to passing pedestrians. Within the broad range of advertising media, the Centerpiece message space falls within the category of Hyper Local-Geo Targeting advertising that reaches consumers at or near the place of purchase. The Centerpiece 155 may be any shape as is desired and may be composed of the same or different material as the remainder of the wayfinding device. In one embodiment, the Centerpiece is circular and threaded on its outside such that it can be screwed into and out of a mating surface of the wayfinding device, shown in FIGS. 2 and 4 as element or area 215, the internal threads located within the Cylinder. In another embodiment, Centerpiece 155 may be interchangeably secured to wayfinding device 100 using screws, locks or other fasteners. Preferably, the Centerpiece is interchangeably secured using the threaded surfaces of 215 and 216 in order to allow easy removal and replacement of the same. The Centerpiece may be installed and removed using a custom tool designed for such purpose, or standard tools which allow for the rotation of the piece along the threads.

Use of the Centerpiece 155 for advertisements allows the owner or its agent to collect advertising fees by allowing, typically, nearby businesses to promote themselves for a set amount of time for a set fee. The interchangeability of the Centerpiece allows the adverting message on the Centerpiece to be updated by the entity managing the wayfinding elements as desired. For example, if a coffee shop advertiser that provides free WiFi ceases to advertise on the Metroglyph Centerpiece that Centerpiece can be replaced by a different Centerpiece displaying an advertisement for a nearby bank that provides ATM services for a fee to tourists, (among its other services.) Similarly, a pharmacy, fast food restaurant, museum or gallery may wish to display its advertising message on the Centerpiece. In part, this messaging serves to inform the pedestrian of the proximate presence of the advertiser's retail location so that the pedestrian could quickly and easily navigate to the store and make an immediate purchase. In general, it should be understood that there is an unlimited variety of advertisements and information that may be placed on the Centerpiece and cannot all be described herein. As a component of the advertisement message, the Centerpiece may contain logos associated with the Advertiser's business and/or symbols for commonly known services or offered by the advertiser such as ATM, Rx, WiFi symbol, knife/fork for restaurant, coffee cup for coffee shop, and bed for a hotel. The Centerpiece may include a direction of travel arrow pointing to the advertiser's place of business, its exact street address and distance away.

The owner of the Metroglyph or its agent that may have installed the wayfinding device may wish to sell advertising to nearby merchants who may wish to solicit passing pedestrians to visit their place of business. In this way it both informs pedestrians of the advertiser's location, essentially a wayfinding function, and it promotes the advertiser's local business, an advertising function. Advertising fees received from these local businesses give rise to a wayfinding/advertising business that supplies a free wayfinding system to the municipality in return for the opportunity to operate a profitable advertising business. Alternatively the message contained in the Centerpiece of the Metroglyph may inform pedestrians of the nearby presence of a Point of Interest, such as a tourist destination, while providing pedestrians with the wayfinding information directing them to the Point of Interest. In either case the advertising or other message depicted on the Centerpiece may be altered, changed or updated as needed to meet the desired function of a particular Metroglyph. Thus, this interchangeable Centerpiece is ideal for changing the type and content of information displayed on the wayfinding device.

In another embodiment, the wayfinding device may comprise several different interchangeable portions, which may be separately manufactured and secured to the wayfinding device as the city or town desires. For example, a second and third interchangeable portion may be incorporated into the wayfinding device 100 which are in the shape of rings having threading on their sides such that the rings may be easily installed and uninstalled. These interchangeable rings may be used in lieu of or in addition to one or more rings 140, 150 or 180.

In use, a pedestrian standing adjacent to or on top of the wayfinding device installed in the horizontal plane of the earth, e.g., in a sidewalk or other walk path, would easily comprehend that if the pedestrian chooses to walk in the northern direction 130a or towards the Uptown direction of Manhattan 160a, the pedestrian would reach West 35$^{th}$ Street. If the pedestrian chose to walk in the southern direction or towards the Downtown direction of Manhattan, the pedestrian would reach West 33$^{rd}$ Street. If the pedestrian chose to walk in the eastern direction or the East Side of Manhattan, the pedestrian would reach Seventh Avenue. Lastly, if the pedestrian chose to walk in the western direction or the West Side of Manhattan, the pedestrian would reach Ninth Avenue. The pedestrian looking for 10$^{th}$ Avenue may further deduce that it is in the same direction as 9$^{th}$ Avenue but it lies further in that same direction.

The following are examples of the different types of information which can be displayed on the wayfinding device 100: city, town or state logos/symbols, decorative elements, distance and direction to any location of interest, such as the city center, banks, ATM's, churches, restrooms, service areas, hotels, restaurants, symbols to indicate such places of interest, such as a fork and knife to denote a restaurant or ATM to denote an ATM. This information may be printed, embossed, engraved or stamped or integrally formed on a Centerpiece 155. Centerpiece 155 may be formed of cast bronze, or may be made of another durable material capable of withstanding the elements and pedestrian foot traffic, etc.

The wayfinding device is preferably of a size which is capable of being easily seen and read by a passing pedestrian. For example, the wayfinding device may be approximately between approximately 20-50 inches along its North-South and East-West axis, with the depth being between approximately 1-3 inches and the Centerpiece 155 being between approximately 5-25 inches in diameter and scaled proportionally to the overall dimensions of the wayfinding device. The Centerpiece 155 and housing or Cylinder may have a depth greater than that of the remaining elements of the wayfinding device. In a preferred embodiment, the wayfinding device is approximately 35 inches along its north-south axis, approximately 32 inches along its east-west axis, and approximately 3 inches deep. When the Centerpiece 155 is round, it preferably has a diameter of approximately 11 inches.

As should be understood, there are numerous aspects to the sitting of the Metroglyph device. For example, there is the device itself embedded in a sidewalk, wall of a building or planter, etc. and used to provide directions to streets, regions and shops. Typically it may be located adjacent to a subway egress point but it may also be used as a continuing wayfinding device to guide pedestrians along the entire walking route to their destination, for example to a tourist Point of Interest or other destination. As another aspect, the wayfinding device is interactive with a Smartphone to provide information to a user of the Smartphone on behalf of a, retailer, restaurant, coffee shop, government entity, museum etc.

The wayfinding device may be accompanied by an internet presence that permits a pedestrian equipped with a Smartphone who is at a Metroglyph to scan a depicted QR Code with a Smartphone and thus open an Application (App) on that Smartphone which provides additional wayfinding information (pertaining to that location) via the pedestrian's Smartphone. An extensive amount of local information may be accessible in this manner including among other topics local retailers, history, rest room facilities, cash machines (ATMs), coffee shops, free WiFi access, hotels, food stores and additional wayfinding information including walking directions to any specific address on the defined area.

While several particular forms of the invention have been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention. Accordingly, it is not intended that the invention be limited, except as by the appended claims.

What is claimed is:

1. A wayfinding device comprising a stylized compass and a messaging element and intended to be embedded in a concrete panel and installed in a sidewalk, building facade, bench, kiosk, bus stop shelter and planter, the stylized compass comprising:

an outer element, a middle element, an inner element, one or more directional indicators, and a centerpiece removable from the inner element, the outer element forms an outer border of the wayfinding device, surrounds the middle element, the inner element and the centerpiece, defines a first space between the outer element and the middle element, and has an upper surface, the middle element surrounds the inner element and the center piece, defines a second space between the middle element and the inner element, and has an upper surface, the inner element comprises a wall forming an inner surface that defines a cavity with the wall having an upper end defining an upper surface which presents visibly when the wayfinding device is installed, the one or more directional indicators have an upper surface and extend from one or more of the outer element, the middle element and the inner element into the first space, the second space or outwardly from the outer element, and wherein the centerpiece comprises an upper surface having the message element and is removably positioned within the cavity formed by the inner element.

2. The wayfinding device of claim 1 wherein the one or more directional indicators extend from the outer element.

3. The wayfinding device of claim 1, wherein the one or more directional indicators extend from the inner element into the second space.

4. The wayfinding device of claim 1, wherein the one or more directional indicators extend from the middle element into the first space.

5. The wayfinding device of claim 1, wherein one or more of the outer element, the middle element and the inner element comprises alphanumeric characters on, in or extending from its upper surface.

6. The wayfinding device of claim 1, wherein the upper surface of the outer element, the upper surface of the middle element, the upper surface of the inner element, the upper surface of the directional indicators and the upper surface of the centerpiece lie generally in the same horizontal plane.

7. The wayfinding device of claim 1, further comprising one or more structural elements extending between and connecting the outer element and the inner element.

8. The wayfinding device of claim 1, wherein the directional indicators comprise a base and one or more alphanumeric element extending from the base and having an upper surface, with the upper surface of the alphanumeric elements being generally in the same horizontal plane.

9. The wayfinding device of claim 8, wherein the directional indicators further comprise an attachment tab extending from the base and attaching the base to the outer element.

10. The wayfinding device of claim 1, wherein the outer element and inner element are made of a metal alloy.

11. The wayfinding device of claim 10, wherein the metal alloy comprises bronze.

12. The wayfinding device of claim 1, wherein the inner surface of the inner element is threaded and the centerpiece is threaded whereby the threads of the centerpiece are threadably mated with the threaded surface of the inner element such that the centerpiece is positioned within the inner element.

13. The wayfinding device of claim 1, wherein the upper surface of the centerpiece comprises a glass upper surface.

14. The wayfinding device of claim 1, wherein the upper surface of the centerpiece comprises one or more of an advertisement, a Quick Response (QR) Code, and a symbol.

15. The wayfinding device of claim 14, wherein scanning the QR code provides a link to a webpage containing information relevant to the location of the wayfinding device.

16. The wayfinding device of claim 1, wherein the wayfinding device is embedded in concrete.

17. The wayfinding device of claim 16, wherein the wayfinding device embedded in concrete is a sidewalk panel.

18. The wayfinding device of claim 1, wherein the messaging element comprises an advertisement.

19. A wayfinding device comprising an Outer Ring, an Inner Ring, and a Centerpiece, wherein:
the Outer Ring has a generally circular shape, defines a first generally circular space within the Outer Ring and from which extends one or more directional indicators outwardly from the Outer Ring, wherein the directional indicators are integrally connected to the Outer Ring, the Outer Ring and the directional indicators having upper surfaces which present visually when installed;
the Inner Ring has a generally circular shape, defines a second generally circular space within the Inner Ring and from which extends one or more directional indicators outwardly from the Inner Ring, wherein the directional indicators are integrally connected to the Inner Ring, the Inner Ring and the directional indicators having upper surfaces which presents visually when installed, and the Inner Ring being positioned in the first generally circular space defined by the Outer Ring; and
the centerpiece is removably positioned within the second generally circular space of the inner ring, wherein the centerpiece has an upper surface which presents visually when installed and the upper surface comprises one or more of an advertisement, a QR code, and a symbol; and
one or more structural elements having upper surfaces connecting the outer ring, inner ring and centerpiece and the upper surfaces of the structural elements do not present visually when the wayfinding devices is installed,
wherein the upper surfaces of the outer ring, inner ring, directional indicators and centerpiece are generally in the same horizontal plane and the upper surfaces of the structural elements are in at least one plane at a different elevation than an elevation of the upper surfaces of the outer ring, inner ring, directional indicators and centerpiece.

* * * * *